(12) United States Patent
Hentschel et al.

(10) Patent No.: US 8,081,847 B2
(45) Date of Patent: Dec. 20, 2011

(54) METHOD FOR UP-SCALING AN INPUT IMAGE AND AN UP-SCALING SYSTEM

(75) Inventors: Christian Hentschel, Cottbus (DE); Stefan Schiemenz, Kolkwitz/Gulben (DE)

(73) Assignee: Brandenburgische Technische Universitaet Cottbus

( * ) Notice: Subject to any disclaimer, the term of this patent is extended or adjusted under 35 U.S.C. 154(b) by 1025 days.

(21) Appl. No.: 11/967,310

(22) Filed: Dec. 31, 2007

(65) Prior Publication Data

US 2009/0169128 A1 Jul. 2, 2009

(51) Int. Cl.
*G06K 9/32* (2006.01)
(52) U.S. Cl. ........................................ 382/299
(58) Field of Classification Search .................... 382/299
See application file for complete search history.

(56) References Cited

U.S. PATENT DOCUMENTS

| | | | | |
|---|---|---|---|---|
| 3,845,242 | A * | 10/1974 | Richeson et al. | 358/469 |
| 5,422,827 | A * | 6/1995 | Niehaus | 702/190 |
| 7,129,962 | B1 * | 10/2006 | Cote et al. | 345/643 |
| 7,263,239 | B2 * | 8/2007 | Kang | 382/250 |
| 2003/0021486 | A1 * | 1/2003 | Acharya | 382/250 |
| 2005/0259885 | A1 * | 11/2005 | Yamazaki | 382/252 |
| 2006/0038823 | A1 * | 2/2006 | Arcas | 345/587 |
| 2006/0222266 | A1 * | 10/2006 | Lauze et al. | 382/299 |
| 2006/0284891 | A1 * | 12/2006 | Kirenko et al. | 345/660 |
| 2007/0003156 | A1 * | 1/2007 | Lin et al. | 382/260 |
| 2007/0152991 | A1 * | 7/2007 | Callway | 345/204 |
| 2008/0025628 | A1 * | 1/2008 | De Haan | 382/255 |
| 2009/0087120 | A1 * | 4/2009 | Wei | 382/266 |

OTHER PUBLICATIONS

"Backprojection by Upsampled Fourier Series Expansion and Interpolated FFT," Makoto Tabei, et al, IEEE Transactions on Image Processing. vol. I. No. I . Jan. 1992, pp. 77-87.*
"L/M-Fold Image Resizing in Block-DCT Domain Using Symmetric Convolution," HyunWook Park, et al, IEEE Transactions on Image Processing, vol. 12, No. 9, Sep. 2003, pp. 1016-1034.*

(Continued)

*Primary Examiner* — Wenpeng Chen
(74) *Attorney, Agent, or Firm* — Schmeiser, Olsen & Watts, LLP

(57) ABSTRACT

The invention relates to techniques of up-scaling an input image represented by an input video signal in an image up-scaling system, especially to a method and an image up-scaling system for up-scaling an input image represented by an input video signal, the method comprising steps of receiving and processing the input video signal in an up-scaling device (21, 23), providing a linear up-scaled video signal generated by the up-scaling device (21, 23) to a signal combining device (24), receiving and processing the input video signal in a harmonics generation device (22, 25, 26, ... , 30), generating an up-scaled output image represented by an up-scaled output video signal by combing the up-scaled video signal with a higher harmonics video output signal provided by the harmonics generation device (22, 25, 26, ... , 30) in the signal combining device (24), and providing the up-scaled output video signal to an output of the combining device (24).

12 Claims, 6 Drawing Sheets

OTHER PUBLICATIONS

"Spatial Up-scaler with Nonlinear Edge Enhancement for Rational Factors," Christian Hentschel et al, International Conference on Consumer Electronics, 2007. ICCE 2007. 5.4-2, 2 pages.*

Zhao et al.: "Making the best of legacy video on modern displays", Journal of the Society for Information Display, vol. 15, Issue 1, pp. 49-60, Jan. 2007.

Greenspan et al.: "Image enhancement by non-linear extrapolation in frequency space", IEEE Transactions on Image Processing, vol. 9, No. 6, pp. 1035-1048, Jun. 2000.

Hentschel: "Generic method for 2D image resizing with non-separable filters", International Conference on Image Processing, Proceedings, Singapore, Oct. 2004, pp. 1653-1656.

Hentschel et al.: "High quality, low complexity image scaler suitable for rational factors", International Conference on Consumer Electronics, Digest of Technical Papers, Las Vegas (USA), 7.-11. Jan. 2006, pp. 179-180.

* cited by examiner

METHOD FOR UP-SCALING AN INPUT IMAGE AND AN UP-SCALING SYSTEM

The invention relates to techniques for up-scaling an input image.

BACKGROUND OF THE INVENTION

Figure 1:
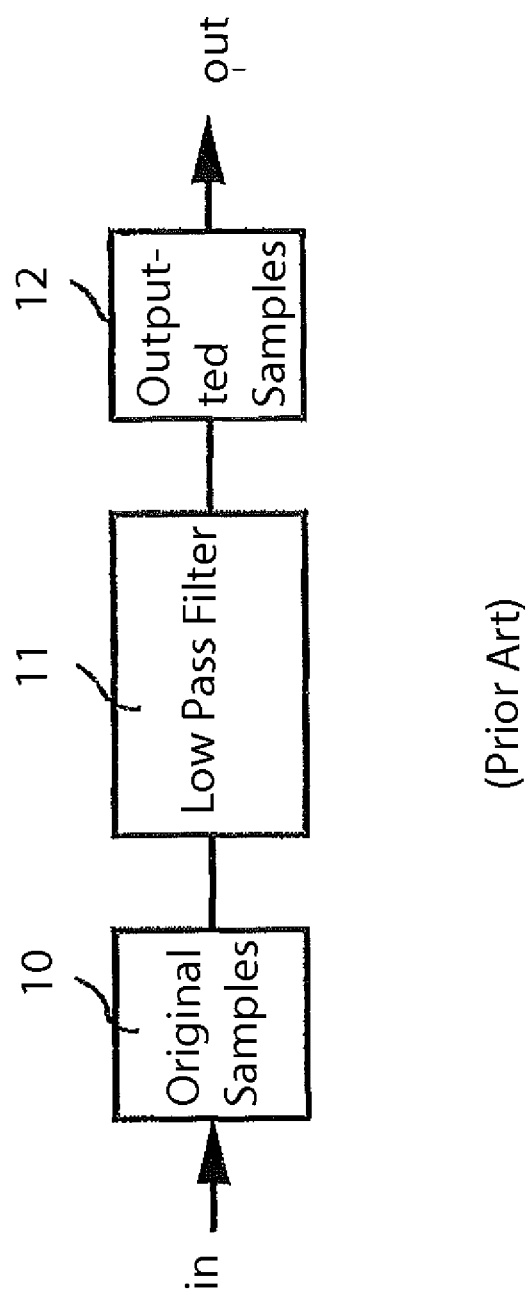

Known techniques for up-scaling an input image use separate interpolation filters for the x- and y-directions. In FIG. 1 a schematic representation of a conventional up-scaling system for one spatial dimension x or y is depicted. After processing the first dimension (e.g. x-direction) with a separable scaler, a similar scaler is used for the second dimension. An up-scaling factor by a rational factor L/M can be achieved by first insertion of (L−1) zero samples between the original samples 10, followed by a low-pass filter 11 to get a smooth function. Thereafter decimation by a factor M is done by simply removing (M−1) samples between the outputted samples 12. The low-pass filter 11 should be designed for the larger value of L or M. Simple, but low quality scalers use bilinear interpolation, more advanced scalers bicubic interpolation or polyphase filters.

Conventional up-scaling methods with separable polyphase filters aim at a broad bandwidth up to the Nyquist frequency of the input image signal to preserve the resolution. The goal is to suppress all frequencies above the Nyquist frequency in order to eliminate the appearance of the original pixel block structure.

In addition to the classical approach with interpolator 10, low-pass filter 11, and decimator 12 in FIG. 1, non-linear methods can be used to increase the sharpness in the output images. A number of non-linear scalers have been described and compared (see Zhao et al.: "Making the best of legacy video on modern displays", Journal of the Society for Information Display, Volume 15, Issue 1, pp. 49-60, January 2007). They are limited to a fixed scaling factor of two which makes the decimation step obsolete. High quality polyphase filters are computationally complex. Independent of their complexity, they can only approximate ideal characteristics. High-order filters approximating ideal low-pass filters have the additional disadvantage of introducing ringing along single lines or edges.

A remaining problem of spatial scaling is the appearance of jagged lines (staircases) with the original pixel structure. They usually appear after applying up-conversion techniques with separable filters, including commonly used bi-cubic interpolation.

Simple techniques introduce additional blurring in the output images. Peaking with linear filters can partially compensate the blurring, but strong peaking may also cause an unnatural image impression. Peaking also increase the sensitivity to noise, creating additional artifacts.

Non-linear scaling methods are typically based on the original pixel grid and therefore limited to natural scaling numbers (2, 3, 4, etc.). The scaling factor is typically fixed to two which limits the range of applications significantly. The various resolutions of TV standards (SD and HD), source and display resolutions in the PC domain and mobile devices cannot be scaled with satisfying results by a fixed scaling factor of two. Even scaling between to HD standards (1920× 1080 and 1280×720) requires a scaling factor of 1.5.

Also, a non-linear scaler has been described which has similarities to the one of the invention disclosure (see Greenspan et al.: "Image enhancement by non-linear extrapolation in frequency space", IEEE Transactions on Image Processing, Vol. 9, No. 6, pp. 1035-1048, June 2000). It includes a separable scaler by a factor of two in the main processing path and the non-linear detail extraction in a parallel path with the same scaling factor. This approach has the disadvantages of keeping parts of the original pixel structure (appearance of jagged lines) due to the separable filter in the main path. Also the other path suffers from the original pixel structure when applying the separable scaling of the high-pass filtered detail signal. In addition, the structure of the parallel path is not suitable to limit the creation of higher frequencies to the output Nyquist frequency. Therefore, newly created alias components will affect the output images.

SUMMARY OF THE INVENTION

It is an object of the invention to provide improved techniques for up-scaling an input image. According to one aspect of the invention, a method for up-scaling an input image represented by an input video signal in an image up-scaling system is provided, the method comprising steps of:

receiving and processing the input video signal in an up-scaling device, wherein the step of processing the input video signal comprises steps of generating an up-scaled video signal from the input video signal by up-scaling the input video signal by a rational factor of L/M, wherein L is an interpolation factor used for an interpolation of the input video signal in an interpolation element in the up-scaling device, and M is a decimation factor used for a decimation in a decimation element in the up-scaling device, and providing the linear up-scaled video signal to a signal combining device, receiving and processing the input video signal in a harmonics generation device, wherein the step of processing the input video signal comprises steps of generating from the input video signal a higher harmonics video output signal representing higher harmonics of the input video signal in the frequency domain, the generating of the higher harmonics video output signal comprising steps of up-scaling the input video signal by a factor of k×(L/M) (k>1), generating a higher harmonics video signal from the up-scaled video signal, and decimating the higher harmonics video signal by a decimating factor of k, and providing the higher harmonics video output signal to the signal combining device, in the signal combining device, generating an up-scaled output image represented by an up-scaled output video signal by combing the up-scaled video signal with the higher harmonics video output signal, and providing the up-scaled output video signal to an output of the combining device.

According to another aspect of the invention, an image up-scaling system for up-scaling an input image represented by an input video signal is provided, the system comprising: an up-scaling device, configured to receive and process the input video signal, and generate an up-scaled video signal from the input video signal; a harmonics generation device, configured to receive and process the input signal, and generate from the input video signal a higher harmonics video output signal representing higher harmonics of the input video signal in the frequency domain, the generating of the higher harmonics video signal comprising steps of up-scaling the input video signal by a factor of k×(L/M) (k>1), generating a higher harmonics video signal from the up-scaled video signal, and decimating the higher harmonics video signal by a decimating factor of k; and a signal combining device, configured to receive the up-scaled video signal and the and the higher harmonics signal, generate an up-scaled output image represented by an up-scaled output video signal by combing the linear up-scaled video signal with the higher harmonics signal, and provide the up-scaled output video signal to an output of the combining device.

By the proposed techniques image up-scaling is suitable for any rational factor. The up-scaling techniques are simple to implement. Complexity is kept low and even minimized compared to known methods for up-scaling. An original pixel block structure and appearance of jagged lines can be avoided. A high quality non-linear detail creation is provided which increases sharpness without introducing annoying artifacts. In addition, a natural image impression is provided. Even an improved robustness to signal noise can be achieved.

A periodic signal such as an alternating black and white pattern contains a base frequency, namely f=1/T, where T is the period of the signal, and multiples of the base frequency (n*f). The multiples of the base frequency are defined as higher harmonics. The base frequency without the higher harmonics would appear as a sinusoidal signal with soft slopes between black and white. The creation of higher harmonics from a base signal with soft slopes can therefore improve the sharpness of the signal, when added to the original input signal.

In a preferred embodiment of the invention, the step of generating the higher harmonics video output signal comprises a step of limiting the higher harmonics video signal in the frequency domain to frequency below a Nyquist frequency limit, wherein the step of limiting is performed by a low-pass filter element. In signal processing theory the Nyquist frequency is defined as half of the sampling frequency. In multidimensional processing the baseband limited by the Nyquist border will not overlap with reproduced spectra by the sampling process. The Nyquist frequency refers to such frequency limit for the up-scaled output image which is provided with an additional frequency space compared to the input image.

According to a preferred embodiment of the invention, the step of generating the higher harmonics video output signal comprises a step of deriving input video signal information from the input video signal by processing the input video signal. In an embodiment the high-pass filter element may be implemented as a band-pass filter element. The filtering in the high-pass filter element extracts relevant detail information from the input video signal based on which the higher harmonics signal may be generated.

In a further embodiment of the invention, the step of up-scaling the input video signal by the factor of k×(L/M) (k>1) is performed in a diamond scaler element. In an embodiment, a filtered signal provided by the high-pass filter element is processed in the step of scaling in the diamond scaler. By the step of scaling an original pixel structure of the input image can be suppressed, and diagonal lines and edges can be smoothed. Such diamond scaler element is known as such (see Hentschel: "Generic method for 2D image resizing with non-separable filters", International Conference on Image Processing, Proceedings, Singapore, October 2004, pp. 1653-1656; Hentschel et al.: "High quality, low complexity image scaler suitable for rational factors", International Conference on Consumer Electronics, Digest of Technical Papers, Las Vegas (USA), 7-11. January 2006, pp. 179-180).

In still a further embodiment of the invention, the step of decimating the higher harmonics video signal by the decimating factor of k is performed in a decimation element.

According to still another embodiment of the invention, the step of generating the higher harmonics video output signal comprises a step of amplifying in an amplifier element. In an embodiment, the amplifier element is connected to an output of the further decimation element. In this way the output signal provided by the further decimation element can be amplified. Amplification can also be realized at another position in the processing chain.

According to a further embodiment of the invention, the step of generating the higher harmonics signal comprises a step of low-pass filtering by a low-pass filter element. In an embodiment, the low-pass filter element is connected to an output of the harmonics generation device which in turn receives, in a preferred embodiment, a scaled input video signal dispatched by the diamond scaler element.

DESCRIPTION OF PREFERRED EMBODIMENTS OF THE INVENTION

Figure 2:
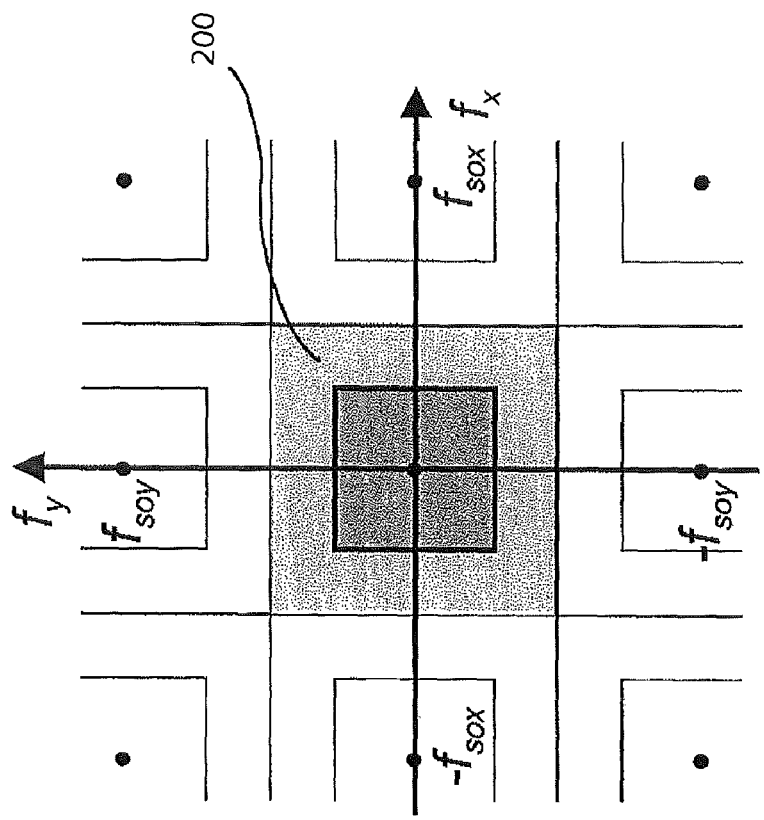
Figure 2:
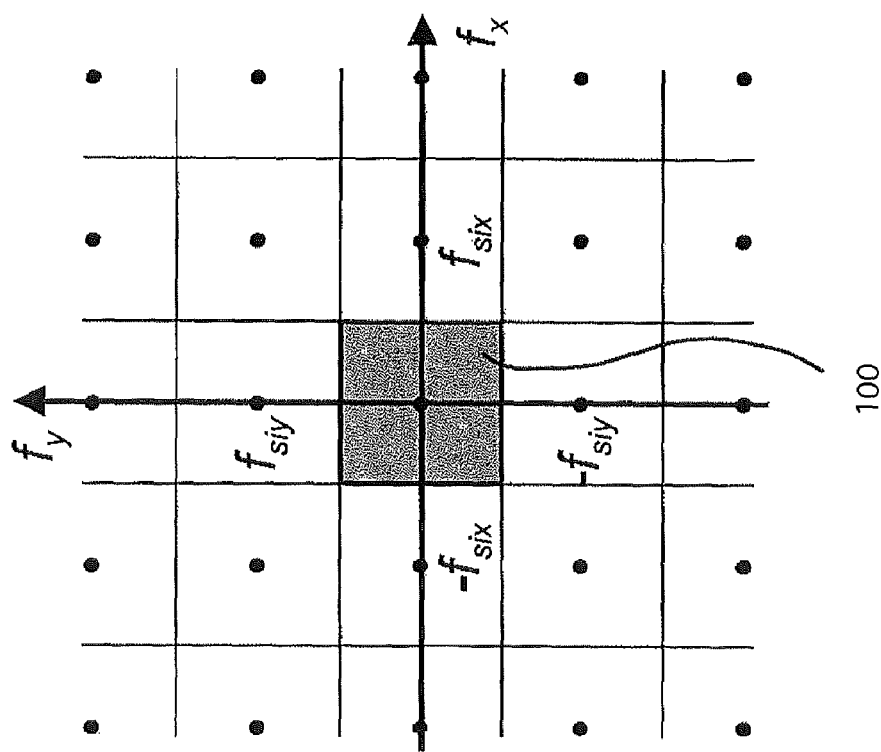
Figure 3:
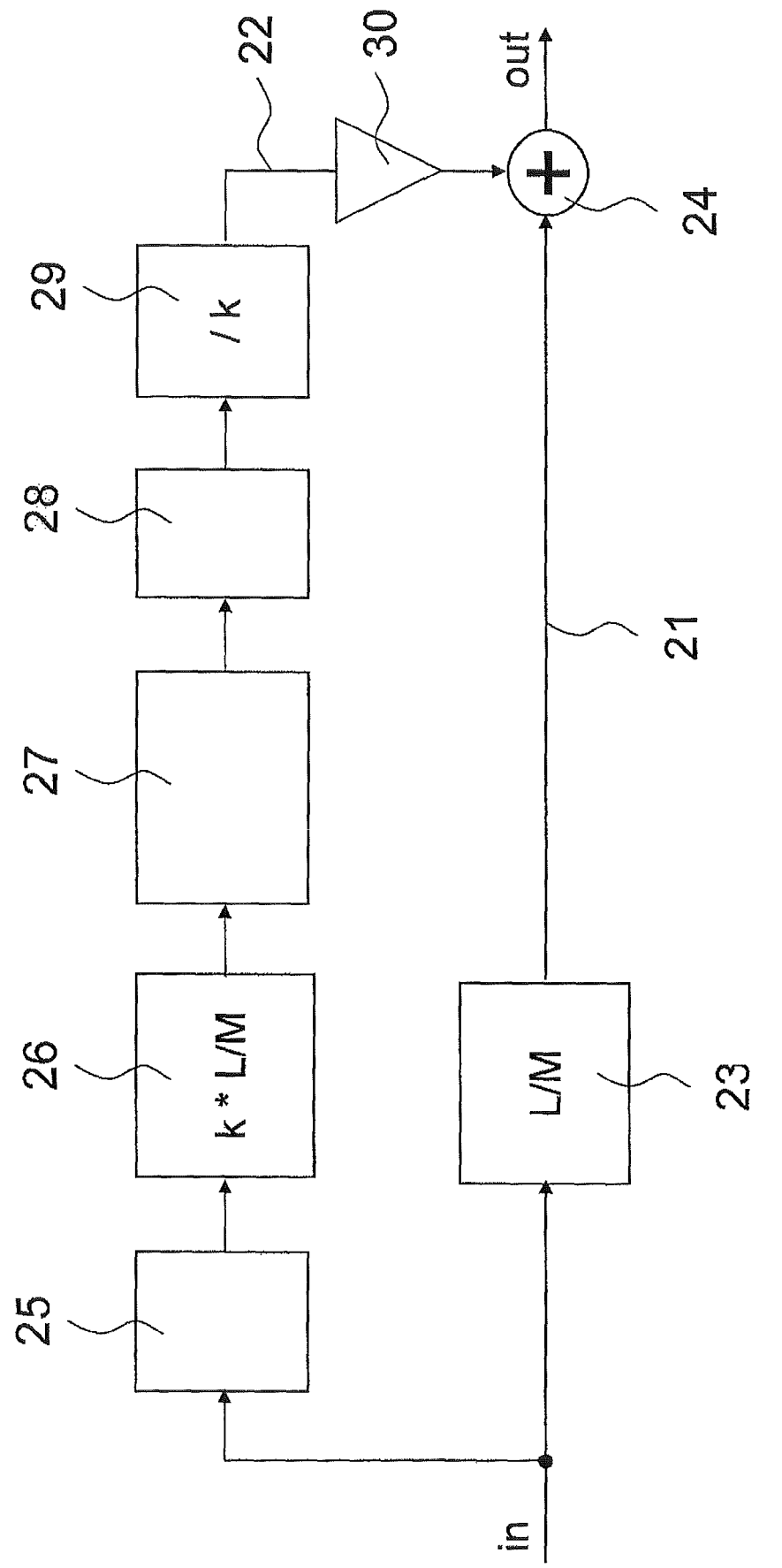
Figure 4:
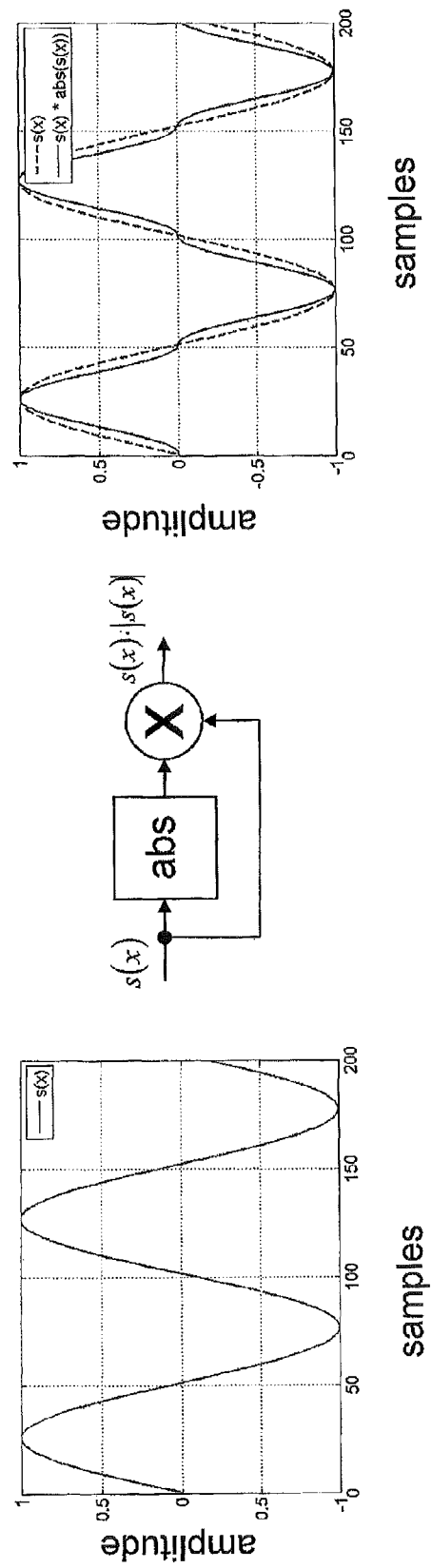
Figure 5:
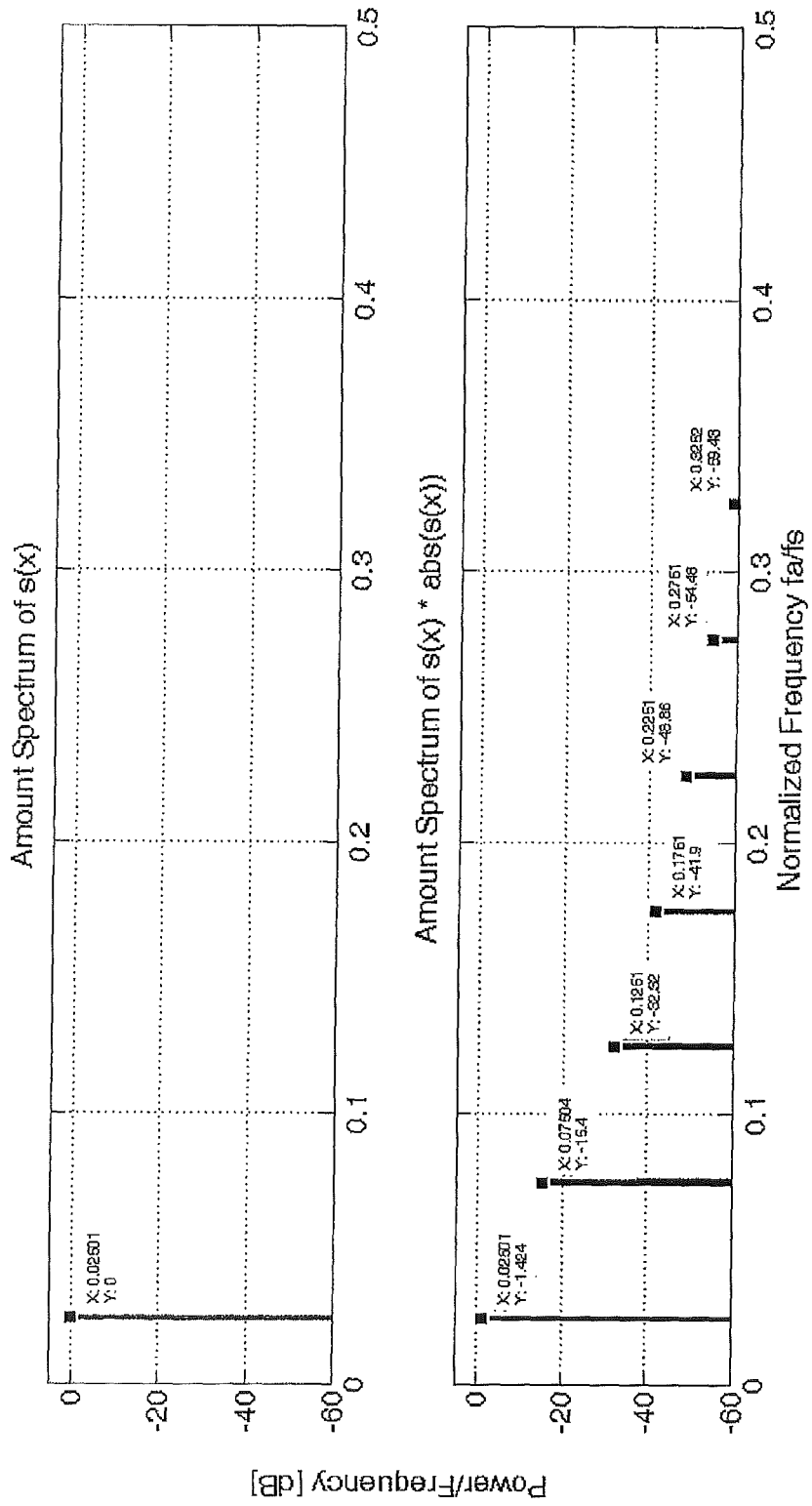
Figure 6:
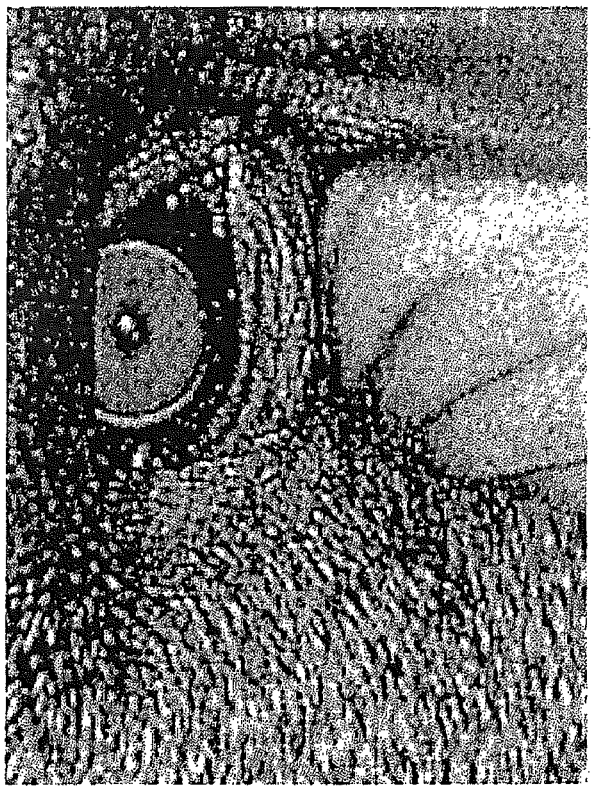
Figure 6:
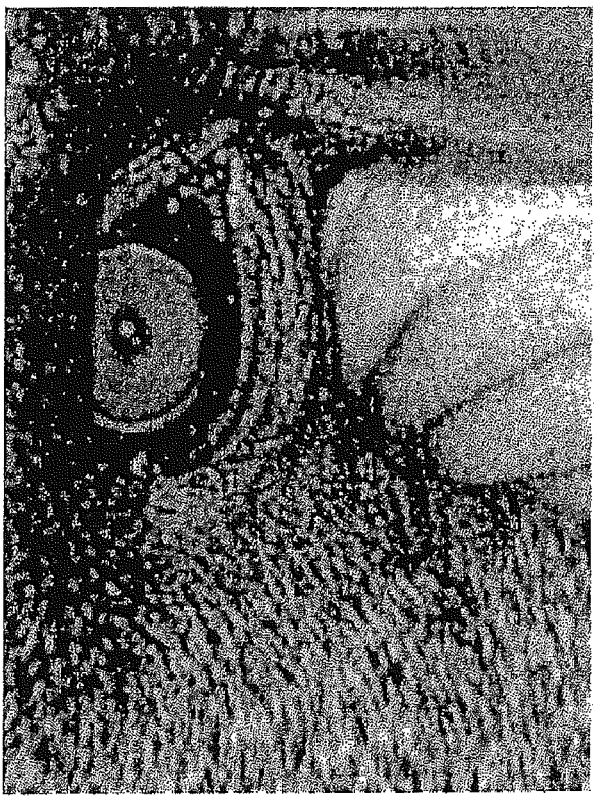

Following, the invention will be described in further detail, by way of example, with reference to different embodiments. In the figures show:

FIG. 1 a schematic representation of a conventional up-scaling system,

FIG. 2 a schematic representation of a two-dimensional frequency space before and after an up-scaling process, FIG. 3 a schematic representation of an up-scaling system, FIG. 4 a processing example for generating higher harmonics: left—input detail signal, mid—the harmonics generation device, and right—non-linear output signal with newly created higher harmonics, FIG. 5 sample spectrum of single input frequency before nonlinear processing (upper part) and output spectrum (bottom part) of input frequency and newly created higher harmonics, and FIG. 6 an image up-scaled by a diamond scaler by a factor of 2.4 and a further image up-scaled by the up-scaling system by a factor of 2.4 on the left hand side and the right hand side, respectively.

Referring to FIG. 2 to 6, a preferred embodiment for a method is described for up-scaling an input image represented by an input video signal in an image up-scaling system.

FIG. 2 shows a schematic representation of a two-dimensional frequency space 100 before and an extended two-dimensional frequency space 200 after an up-scaling process. Before sampling, the baseband of the original image must be limited to the Nyquist frequency fsi/2 of the sampling rate in both dimensions (dark part), because all baseband frequencies will be reproduced at multiples of the sampling frequency fsi (see center dots at left side of FIG. 2). Reproduced frequencies from the sampling frequency spectra, which fall into the baseband, would cause alias artifacts.

In case of up-scaling, the up-scaled image would use only a part of the available frequency space 200. The additional frequency space is limited by the output Nyquist frequency fso/2 which is half of the output sampling frequency fso.

The additionally available frequency space in the up-scaled image is used by creating higher harmonics which is a non-linear process. A non-linear process can create higher harmonics from the input video signal representing an input image to be up-scaled, but these higher harmonics will not necessarily be limited to the output Nyquist frequency. Therefore, frequencies above the output Nyquist frequency will create alias artifacts from the non-linear processing using known up-scalers.

The proposed method for up-scaling an input image avoids the creation of artifacts. In contrast to fixed scaling factors, the design of arbitrary scalers (rational scaling factors) provides for: taking into account the cut-off (Nyquist-) frequency of the input video signal as well as the additional available frequency space after up-scaling, and limitation of higher harmonics to the new Nyquist frequency of the up-scaled image.

FIG. 3 shows a schematic representation of an up-scaling system.

For flexible scaling factors and a wide range of applications, it is desirable to keep the algorithm used for the up-scaling process simple and as many parameters as possible fixed, independent of the scaling factor.

According to FIG. 3, the up-scaling system comprises two paths, namely a lower path 21 and an upper path 22. In the lower path 21 the input image is scaled by a scaler 23 by the factor L/M to a new output image format. The scaler 23 may be implemented as described with reference to FIG. 1 above. The upper path 22 depicts the detail signal and creates higher harmonics in the up-scaled image which is then added to the scaled image of the lower path 21 by a signal combining element 24.

In the upper path 22, a high-pass filter element 25 which may also be provided as a band-pass filter element processes the video input signal representing the input image and extracts relevant detail information on which a creation of higher harmonics will be based later. The high-pass filter element 25 is implemented independent of a scaler 26 which may be implemented as a diamond scaler. The scaler 26 by a factor of (k×L/M) creates a new up-scaled frequency space which has k-times the Nyquist limit of the resulting up-scaled output image. Factor k may be rational and is bigger than one, a suitable factor is about two or higher. The extended frequency space by factor k allows low-pass filtering of the harmonics beyond the Nyquist limit of the up-scaled image.

The creation of higher harmonics can be realized in different ways. It is done in a higher harmonics creator 27 connected to the scaler 26. The additionally created higher harmonics are not limited in the frequency range. This is done by a succeeding low-pass filter element 28 with fixed coefficients to avoid frequency components above the Nyquist limit of the output image. Thereafter, by a decimation element 29 a decimation by k results in a detail signal using the available frequency range very efficiently. In an optional step the signal is amplified by an amplifier element 30. The amplifier element may also be elsewhere in the processing path 22. By the elements referred to by the reference numerals 22, 25, . . . , 30 a harmonics generation device is provided.

An example of image up-scaling is an application using a high resolution displays with 1920 pixels by 1080 lines, while the HD (high definition) input signal has the format 1280 pixels by 720 lines. The required up-scaling factor is 1.5.

In FIG. 3, an up-scaling by a factor L/M=1.5 is depicted. The up-scaling system comprises the two paths 21, 22. In the lower path 1 the input image is scaled with the diamond scaler 23 by the factor L/M to the new output format with L=3 and M=2. The upper path 22 depicts the detail signal and creates higher harmonics in the up-scaled image which is then added to the scaled image of the lower path 21 in the signal combining element 24.

The high-pass filter element 25 in the upper path 22 eliminates DC-signals (very low frequency components) and extracts frequencies which contribute to sharpness in details and textured regions. A digital filter contains delay elements where the delayed signals can be weighted by coefficients and added to the filtered output signal. The chosen filter may have the coefficients (−0.25, 0.5, −0.25) in each dimension. The delay elements may be two pixel delays in the horizontal direction and two line delays in the vertical direction. For video, it may be an advantage to use a band-pass filter element. In such case, for example, the high-pass filter element 5 has the coefficients (−0.25, 0, 0.5, 0, −0.25), realized with four pixel delays in the horizontal direction, followed by a filter the four line delays in the vertical direction.

The scaler 26 in the upper path 22 by a factor of (k×L/M) (k>1, e.g. k=2)) creates a new up-scaled frequency space which has twice the Nyquist limit of the resulting up-scaled output image. The extended frequency space by factor k allows low-pass filtering of the higher harmonics beyond the Nyquist limit of the up-scaled and sampled output image.

The succeeding diamond scaler element 26 can be implemented according to known principles (see for example Hentschel: "Generic method for 2D image resizing with non-separable filters", International Conference on Image Processing, Proceedings, Singapore, October 2004, pp. 1653-1656). In the depicted embodiment, such scaler type is also used for the lower path 21 and has many advantages. The original pixel structure of the input images will be suppressed, and diagonal lines or edges are very smooth after scaling.

The creation of higher harmonics in the higher harmonics creator 27 is realized by a multiplication of the up-scaled input signal with its absolute value. FIG. 4 shows a processing example for generating higher harmonics: left—input detail signal, mid—the harmonics generation device, and right—output signal with newly created higher harmonics.

FIG. 5 shows a sample spectrum before and after processing with the higher harmonics creator 27. In the spatial domain FIG. 4 already describes the creation of higher harmonics. The input detail signal in FIG. 4 contains a single frequency which is shown by the upper spectrum of FIG. 5. The input signal with a single frequency is far below the output Nyquist frequency 0.5 fa/fs. After processing by the higher harmonics creator 27 (FIG. 4 mid) with non-linear processing, additional higher harmonics at multiples of the input frequency appear (lower part of FIG. 5). These additional higher harmonics contribute to the desired resolution enhancement.

The additionally created higher harmonics are not limited in the frequency range. This is done by the succeeding low-pass filter element 28 with fixed coefficients, e.g. separable filter with coefficients (0.25, 0.5, 0.25) to avoid strong frequency components above the Nyquist limit of the output image. Thereafter, by a decimation element 29 (see FIG. 3) decimation by k results in a detail signal using the available frequency range very efficiently and match the output sample grid (resolution) of the up-scaled input image provided by the diamond scaler 23 (see FIG. 3).

FIG. 6 shows an image up-scaled by a diamond scaler by a factor of 2.4 and a further image up-scaled by the up-scaling system with non-linear detail enhancement by a factor of 2.4 on the left hand side and the right hand side, respectively.

The features disclosed in at least one of the specification, the claims and the figures may be material for the realization of the invention in its various embodiments, taken in isolation or in various combinations thereof.

The invention claimed is:

1. A method for up-scaling an input image represented by an input video signal in an image up-scaling system, the method comprising steps of:
   receiving and processing the input video signal in an up-scaling device (21, 23), wherein the step of receiving and processing the input video signal in the up-scaling device (21, 23) comprises steps of:
   generating a first up-scaled video signal from the input video signal by up-scaling the input video signal by a rational factor of L/M, wherein L is an interpolation factor used for an interpolation of the input video signal in an interpolation element in the up-scaling device (21, 23), and M is a decimation factor used for a decimation in a decimation element in the up-scaling device (21, 23), and providing the first up-scaled video signal to a signal combining device (24), receiving and processing the input video signal in a harmonics generation device (22, 25, 26, . . . , 30), wherein the step of receiving and processing the input video signal in the harmonics generating device (22, 25, 26, . . . , 30) comprises steps of:

generating from the input video signal a higher harmonics video output signal representing higher harmonics of the input video signal in a frequency domain, the generating of the higher harmonics video output signal comprising steps of up-scaling the input video signal by a factor of k×(L/M) (k>1) to form a second up-scaled video signal, generating a higher harmonics video signal from the second up-scaled video signal, and decimating the higher harmonics video signal by a decimating factor of k, and providing the higher harmonics video output signal to the signal combining device (24), in the signal combining device (24), generating an up-scaled output image represented by an up-scaled output video signal by combing the first up-scaled video signal with the higher harmonics video output signal, and providing the up-scaled output video signal to an output of the combining device (24).

2. Method according to claim 1, wherein the step of generating the higher harmonics video output signal comprises a step of limiting the higher harmonics video signal in the frequency domain to frequency below a Nyquist frequency limit, wherein the step of limiting is performed by a low-pass filter element (28).

3. Method according to claim 1, wherein the step of generating the higher harmonics video output signal comprises a step of deriving input video signal information from the input video signal by processing the input video signal.

4. Method according to claim 1, wherein the step of up-scaling the input video signal by the factor of k×(L/M) (k>1) is performed in a diamond scaler element (26).

5. Method according to claim 1, wherein the step of decimating the higher harmonics video signal by the decimating factor of k is performed in a decimation element (29).

6. Method according to claim 1, wherein the step of generating the higher harmonics video output signal comprises a step of amplifying in an amplifier element (30).

7. An image up-scaling system for up-scaling an input image represented by an input video signal, the system comprising:

an up-scaling device (21, 23), configured to:
  receive and process the input video signal, and
  generate a first up-scaled video signal from the input video signal, a harmonics generation device (22, 25, 26, . . . , 30), configured to:
  receive and process the input signal, and
  generate from the input video signal a higher harmonics video output signal representing higher harmonics of the input video signal in a frequency domain, the generating of the higher harmonics video output signal comprising steps of up-scaling the input video signal by a factor of k×(L/M) (k>1) to form a second up-scaled video signal, generating a higher harmonics video signal from the second up-scaled video signal, and decimating the higher harmonics video signal by a decimating factor of k, and a signal combining device (24), configured to:
  receive the second up-scaled video signal and the higher harmonics video output signal,
  generate an up-scaled output image represented by an up-scaled output video signal by combining the first up-scaled video signal with the higher harmonics video output signal, and
  provide the up-scaled output video signal to an output of the combining device (24).

8. System according to claim 7, wherein the harmonics generation device (22, 25, 26, . . . , 30) comprises a low-pass filter element (28) configured to limit the higher harmonics video signal in the frequency domain to frequency below a Nyquist frequency limit.

9. System according to claim 7, wherein the harmonics generation device (22, 25, 26, . . . , 30) comprises a high-pass filter element (25) configured to derive input video signal information from the input video signal by processing the input video signal.

10. System according to claim 7, wherein the harmonics generation device (22, 25, 26, . . . , 30) comprises a diamond scaler element (26) configured to up-scale the input video signal by the factor of k×(L/M) (k>1).

11. System according to claim 7, wherein the harmonics generation device (22, 25, 26, . . . , 30) comprises a decimation element (29) configured to decimate the higher harmonics video signal by the decimating factor of k to the higher harmonics video output signal.

12. System according to claim 7, wherein the harmonics generation device (22, 25, 26, . . . , 30) comprises an amplifier element (30) configured for signal amplification.

* * * * *